United States Patent
Tatikonda et al.

(10) Patent No.: US 10,628,283 B2
(45) Date of Patent: Apr. 21, 2020

(54) DEPLOYMENT TOOL THAT CORRECTS DEPLOYMENT ERRORS

(71) Applicant: Bank of America Corporation, Charlotte, NC (US)

(72) Inventors: Srinivas Tatikonda, Hyderabad (IN); Sandeep Kumar Chauhan, Hyderabad (IN)

(73) Assignee: Bank of America Corporation, Charlotte, NC (US)

( * ) Notice: Subject to any disclaimer, the term of this patent is extended or adjusted under 35 U.S.C. 154(b) by 144 days.

(21) Appl. No.: 15/918,584

(22) Filed: Mar. 12, 2018

(65) Prior Publication Data

US 2019/0278693 A1    Sep. 12, 2019

(51) Int. Cl.
*G06F 11/00*     (2006.01)
*G06F 11/36*     (2006.01)
*G06F 8/60*      (2018.01)

(52) U.S. Cl.
CPC ............ *G06F 11/3612* (2013.01); *G06F 8/60* (2013.01); *G06F 11/3692* (2013.01)

(58) Field of Classification Search
CPC .... G06F 11/3612; G06F 11/3664; G06F 8/70; G06F 8/71
See application file for complete search history.

(56) References Cited

U.S. PATENT DOCUMENTS

| | | | |
|---|---|---|---|
| 7,246,229 B2 | 7/2007 | Suermondt et al. | |
| 7,490,073 B1 | 2/2009 | Qureshi et al. | |
| 7,624,394 B1 | 11/2009 | Christopher, Jr. | |
| 7,779,402 B2 | 8/2010 | Abernethy et al. | |
| 7,788,536 B1 | 8/2010 | Qureshi et al. | |
| 7,865,888 B1 | 1/2011 | Qureshi et al. | |
| 7,870,550 B1 | 1/2011 | Qureshi et al. | |
| 7,900,201 B1 | 3/2011 | Qureshi et al. | |
| 7,954,090 B1 | 5/2011 | Qureshi et al. | |
| 7,996,814 B1 | 8/2011 | Qureshi et al. | |
| 8,001,527 B1 | 8/2011 | Qureshi et al. | |
| 8,756,576 B2 * | 6/2014 | Balasubramanian | G06F 8/33 717/101 |
| 9,026,856 B2 * | 5/2015 | Hecox | G06F 11/0793 714/38.1 |
| 9,176,728 B1 * | 11/2015 | Dixit | G06F 8/71 |
| 9,424,525 B1 * | 8/2016 | Byrne | G06F 11/3696 |
| 9,672,252 B2 * | 6/2017 | Landry | G06F 11/0706 |
| 10,108,482 B2 * | 10/2018 | Kumar | G06F 11/0793 |

(Continued)

*Primary Examiner* — Elmira Mehrmanesh
(74) *Attorney, Agent, or Firm* — Michael A. Springs

(57) ABSTRACT

A deployment tool includes a memory and a hardware processor. The memory stores a solution matrix that indicates a first error, a second error, a first solution, and a second solution. The processor detects that a first piece of software has been deployed in a first environment and that a second piece of software has been deployed in a second environment. The processor also determines that the first error occurred when the first piece of software was deployed and that the second error occurred when the second piece of software was deployed. The processor determines that the first solution should be implemented to correct the first error and that the second solution should be implemented to correct the second error. The processor implements the first solution in the first environment and the second solution in the second environment.

15 Claims, 3 Drawing Sheets

(56) References Cited

U.S. PATENT DOCUMENTS

| | | | |
|---|---|---|---|
| 10,198,255 B2* | 2/2019 | Higginson | G06F 11/3664 |
| 2010/0333066 A1* | 12/2010 | Feniello | G06F 11/0778 |
| | | | 717/120 |
| 2015/0271008 A1* | 9/2015 | Jain | H04L 41/0686 |
| | | | 714/57 |
| 2016/0246591 A1* | 8/2016 | Eberlein | G06F 8/65 |
| 2016/0259638 A1* | 9/2016 | El Maghraoui | G06F 17/2785 |
| 2017/0337560 A1* | 11/2017 | Wang | G06F 3/0482 |
| 2018/0285750 A1* | 10/2018 | Purushothaman | H04L 43/0823 |
| 2019/0087251 A1* | 3/2019 | Purushothaman | G06F 11/0709 |

* cited by examiner

DEPLOYMENT TOOL THAT CORRECTS DEPLOYMENT ERRORS

TECHNICAL FIELD

This disclosure relates generally to software deployment.

BACKGROUND

Computers are used ubiquitously throughout organizations by members and employees to execute software. The software is typically deployed to these computers so that the computers can execute the software.

SUMMARY OF THE DISCLOSURE

Computers are used ubiquitously throughout organizations by members and employees to execute software. The software is typically deployed to these computers so that the computers can execute the software. Even after the software is deployed, software updates and/or software patches are periodically deployed to the computers to update and/or repair the software. Each time a piece of software (e.g., the original software, a software update, and/or a software patch) is deployed, there is a chance that errors may occur. For example, a software update could be deployed to a wrong location. As another example, a software patch may introduce other errors and/or bugs. If these errors are not repaired, then the computer is not capable of executing the software for its intended use.

This disclosure contemplates a deployment tool that automatically determines whether errors occurred during deployment, determines solutions for the errors, and then implements the determined solutions. The deployment tool detects when a piece of software is deployed and then examines the deployment to determine whether an error occurred during deployment. The deployment tool then analyzes the error to determine a solution for the error and implements the solution. In this manner, the deployment tool repairs errors that occur during software deployment which ensures that the software is executable in certain embodiments. Three embodiments of the deployment tool are described below.

According to an embodiment, a deployment tool includes a memory and a hardware processor communicatively coupled to the memory. The memory stores a solution matrix. The solution matrix indicates a first error, a second error, a first solution, and a second solution. The processor detects that a first piece of software has been deployed in a first environment and that a second piece of software has been deployed in a second environment. The processor also determines that the first error occurred when the first piece of software was deployed and that the second error occurred when the second piece of software was deployed. The processor determines, based on the solution matrix, that the first solution should be implemented to correct the first error and determines, based on the solution matrix, that the second solution should be implemented to correct the second error. In response to the determination that the first solution should be implemented, the processor implements the first solution in the first environment. In response to the determination that the second solution should be implemented, the processor implements the second solution in the second environment.

According to another embodiment, a method includes storing, by a memory, a solution matrix. The solution matrix indicates a first error, a second error, a first solution, and a second solution. The method also includes detecting, by a hardware processor communicatively coupled to the memory, that a first piece of software has been deployed in a first environment and detecting, by the hardware processor, that a second piece of software has been deployed in a second environment. The method further includes determining, by the hardware processor, that the first error occurred when the first piece of software was deployed and determining, by the hardware processor, that the second error occurred when the second piece of software was deployed. The method also includes determining, by the hardware processor, based on the solution matrix, that the first solution should be implemented to correct the first error and determining, by the hardware processor, based on the solution matrix, that the second solution should be implemented to correct the second error. The method further includes in response to the determination that the first solution should be implemented, implementing, by the hardware processor, the first solution in the first environment and in response to the determination that the second solution should be implemented, implementing, by the hardware processor, the second solution in the second environment.

According to yet another embodiment, a system includes a first environment, a second environment, and a deployment tool. The deployment tool stores a solution matrix. The solution matrix indicates a first error, a second error, a first solution, and a second solution. The deployment tool also detects that a first piece of software has been deployed in the first environment and detects that a second piece of software has been deployed in the second environment. The deployment tool further determines that the first error occurred when the first piece of software was deployed and determines that the second error occurred when the second piece of software was deployed. The deployment tool also determines, based on the solution matrix, that the first solution should be implemented to correct the first error and determines, based on the solution matrix, that the second solution should be implemented to correct the second error. The deployment tool further in response to the determination that the first solution should be implemented, implements the first solution in the first environment and in response to the determination that the second solution should be implemented, implements the second solution in the second environment.

Certain embodiments provide one or more technical advantages. For example, an embodiment automatically repairs errors that occur during software deployment. As another example, an embodiment ensures that software remains executable after software update and patches are deployed. Certain embodiments may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present disclosure, reference is now made to the following description, taken in conjunction with the accompanying drawings, in which.

DETAILED DESCRIPTION

Figure 1:
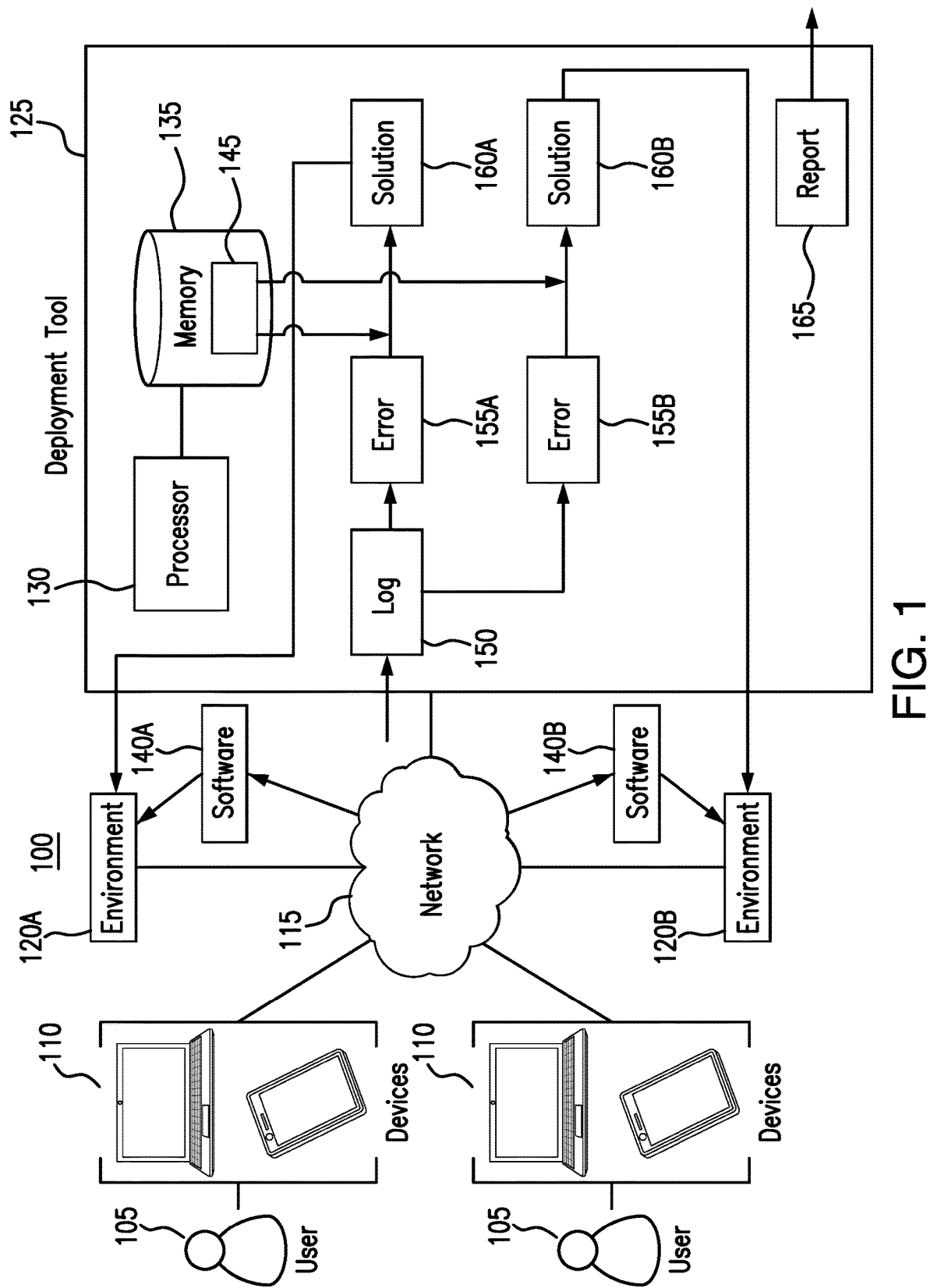
FIG. 1 illustrates an example system for deploying software.
Figure 2:
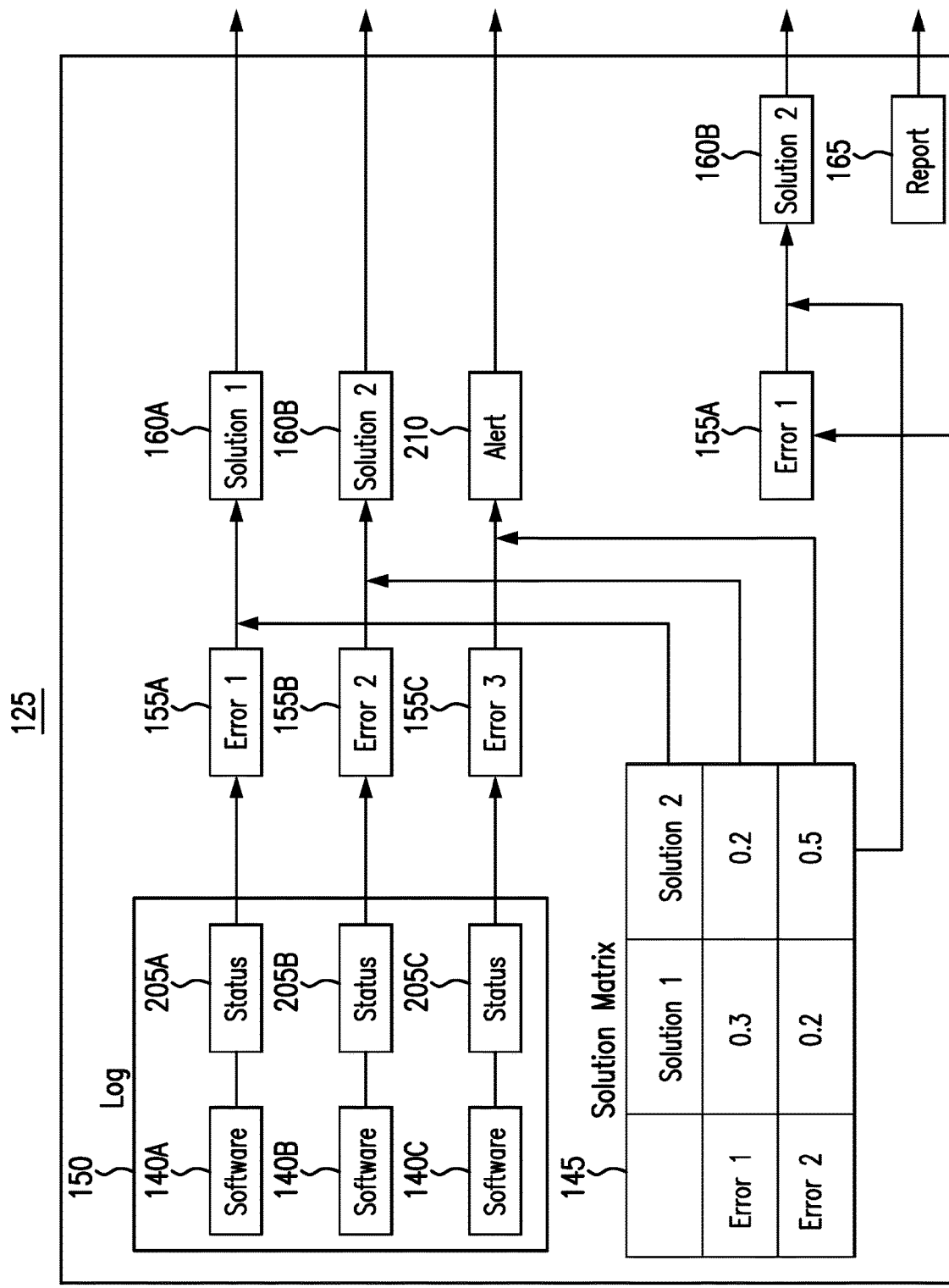
FIG. 2 illustrates an example deployment tool of the system of FIG. 1.
Figure 3:
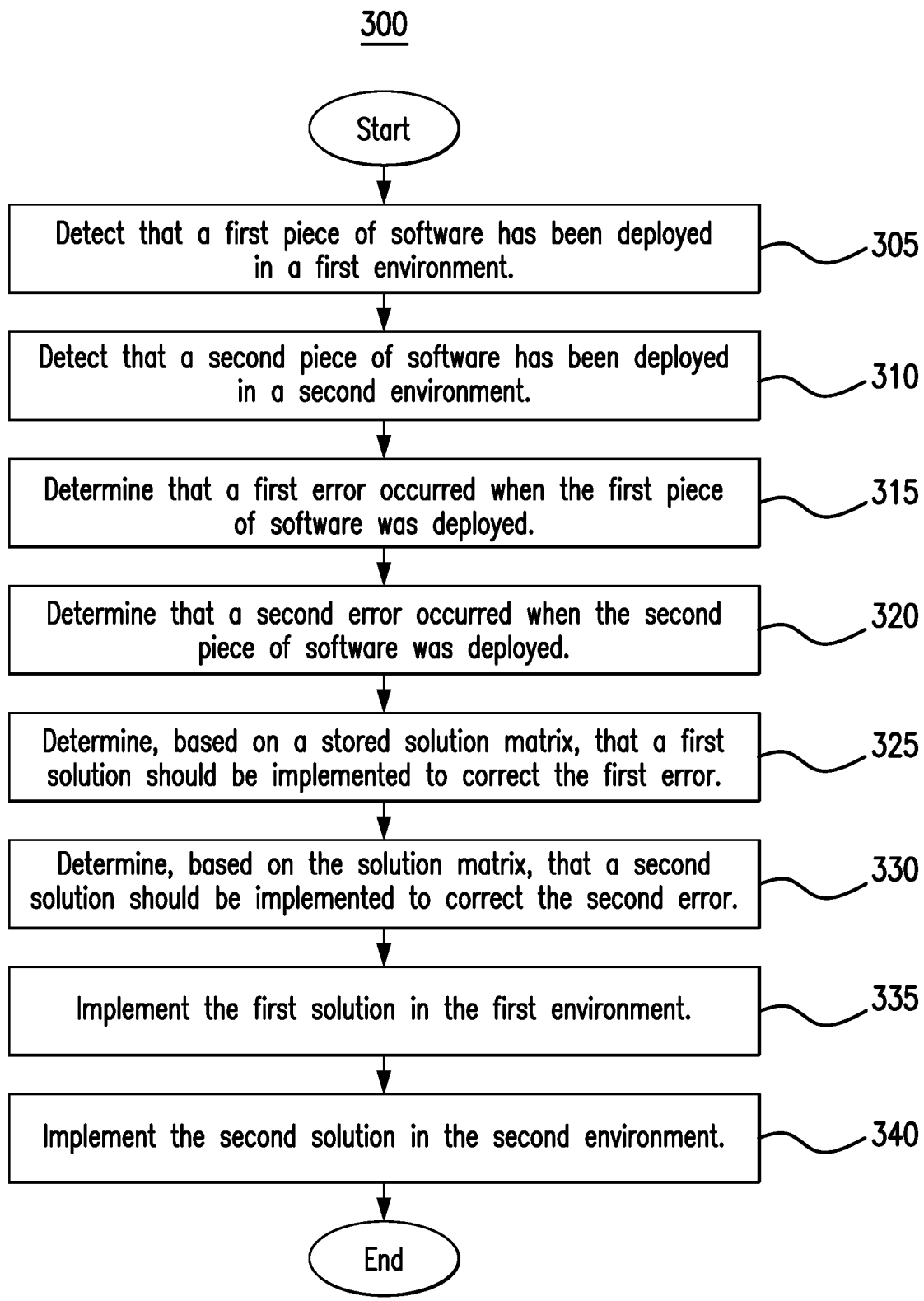
FIG. 3 is a flowchart illustrating a method for deploying software using the system of FIG. 1.

Embodiments of the present disclosure and its advantages are best understood by referring to FIGS. 1 through 3 of the drawings, like numerals being used for like and corresponding parts of the various drawings.

Computers are used ubiquitously throughout organizations by members and employees to execute software. The software is typically deployed to these computers so that the computers can execute the software. Even after the software is deployed, software updates and/or software patches are periodically deployed to the computers to update and/or repair the software. Each time a piece of software (e.g., the original software, a software update, and/or a software patch) is deployed, errors may occur. For example, a software update could be deployed to a wrong location. As another example, a software patch may introduce other errors and/or bugs. If these errors are not repaired, then the computer is not capable of executing the software for its intended use.

This disclosure contemplates a deployment tool that automatically determines whether errors occurred during deployment, determines solutions for the errors, and then implements the determined solutions. The deployment tool detects when a piece of software is deployed and then examines the deployment to determine whether an error occurred during deployment. The deployment tool then analyzes the error to determine a solution for the error and implements the solution. In this manner, the deployment tool repairs errors that occur during software deployment which ensures that the software is executable in certain embodiments. The deployment tool will be described using FIGS. 1 through 3. FIG. 1 will describe the deployment tool generally. FIGS. 2 and 3 will describe the deployment tool in more detail.

FIG. 1 illustrates an example system 100 for deploying software. As illustrated in FIG. 1, system 100 includes one or more devices 110, a network 115, one or more environments 120, and a deployment tool 125. In certain embodiments, system 100 repairs errors that occur during software deployment which ensures that the software is executable.

Devices 110 are used by users 105 to create and/or deploy software 140 to environment 120. Devices 110 can also receive reports about the deployment of software 140 including any errors that were detected and/or resolved. In some embodiments, devices 110 are included in environments 120.

Devices 110 include any appropriate device for communicating with components of system 100 over network 115. For example, devices 110 may be a telephone, a mobile phone, a computer, a laptop, a tablet and/or an automated assistant. This disclosure contemplates device 110 being any appropriate device for sending and receiving communications over network 115. As an example and not by way of limitation, device 110 may be a computer, a laptop, a wireless or cellular telephone, an electronic notebook, a personal digital assistant, a tablet, or any other device capable of receiving, processing, storing, and/or communicating information with other components of system 100. Device 110 may also include a user interface, such as a display, a microphone, keypad, or other appropriate terminal equipment usable by user 105. In some embodiments, an application executed by device 110 may perform the functions described herein.

Network 115 facilitates communication between and amongst the various components of system 100. This disclosure contemplates network 115 being any suitable network operable to facilitate communication between the components of system 100. Network 115 may include any interconnecting system capable of transmitting audio, video, signals, data, messages, or any combination of the preceding. Network 115 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components.

System 100 includes one or more environments 120. In the illustrated example of FIG. 1, system 100 includes environment 120A and environment 120B. Environment 120 includes one or more devices that execute software 140. For example, an environment 120 can include desktops, laptops, servers, clusters, and/or distributed systems. One or more of the devices in the environment 120 can execute software 140 that is deployed to the device. When executed, the results of the execution can be communicated back to one or more devices 110. This disclosure contemplates an environment 120 including any number of devices.

Software 140 is deployed to environment 120. In the illustrated example of FIG. 1, software 140A is deployed to environment 120A and software 140B is deployed to environment 120B. This disclosure contemplates software deployment including any of installation, updating, and/or patching software into environment 120. For example, deployment of software 140A may be a fresh installation of an application into environment 120A. As another example, deployment of software 140B may be the deployment of a software update or software patch to an application that is already installed in environment 120B. In some instances, deployment of software 140 may introduce errors and/or bugs into environment 120. For example, software 140 may be deployed to an improper location and/or device within environment 120. As another example, software 140 may include bugs and/or errors that should not be deployed to environment 120. When software 140 is deployed improperly to environment 120, the devices of environment 120 may cease to execute software 140 properly. For example, if software 140 is deployed to an improper location, then software 140 may not be executed by the proper devices within environment 120. As another example, if software 140 includes errors and/or bugs, then when the devices of environment 120 execute software 140, the execution may fail.

Deployment tool 125 detects and repairs improper software deployment. As shown in FIG. 1, deployment tool 125 includes a processor 130 and memory 135. This disclosure contemplates processor 130 and memory 135 being configured to perform any of the operations of deployment tool 125 described herein. In certain embodiments, deployment tool 125 ensures that devices in environment 120 execute software 140 by detecting and repairing errors in the deployment of software 140.

Processor 130 is any electronic circuitry, including, but not limited to microprocessors, application specific integrated circuits (ASIC), application specific instruction set processor (ASIP), and/or state machines, that communicatively couples to memory 140 and controls the operation of deployment tool 125. Processor 130 may be 8-bit, 16-bit, 32-bit, 64-bit or of any other suitable architecture. Processor 130 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. Processor 130 may include other hardware and software that operates to control and process information. Processor 130 executes software stored on memory to perform any of the functions described herein. Processor 130 controls the operation and administration of deployment tool 125 by processing information received from network 115, device(s) 110, and memory 135. Processor 130 may be a programmable logic device, a microcontroller, a microprocessor, any suitable processing device, or any suitable combination of the preceding. Processor 130 is not limited to a single processing device and may encompass multiple processing devices.

Memory 135 may store, either permanently or temporarily, data, operational software, or other information for processor 130. Memory 135 may include any one or a combination of volatile or non-volatile local or remote devices suitable for storing information. For example, memory 135 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in memory 135, a disk, a CD, or a flash drive. In particular embodiments, the software may include an application executable by processor 130 to perform one or more of the functions described herein.

Memory 135 stores a solution matrix 145. Solution matrix 145 is used by deployment tool 125 to detect and/or assess errors in the deployment of software 140. Solution matrix 145 also indicates solutions for repairing errors. Deployment tool 125 uses solution matrix 145 to diagnose and to determine solutions to repair errors. Solution matrix 145 will be described in more detail using FIG. 2.

Deployment tool 125 receives a log 150. Log 150 is generated and/or maintained by one or more devices in environment 120. In some embodiments, log 150 is aggregated amongst one or more environments 120. For example, log 150 may be an aggregated log for environments 120A and 120B. Log 150 indicates the status of one or more software deployments and environments 120. For example, log 150 can indicate the status of the deployment of software 140A in environment 120A and the status of the deployment of software 140B in environment 120B. These statuses can indicate that one or more errors have occurred in the deployment of software 140A and software 140B. For example, log 150 may indicate that software 140A is being deployed to an improper or wrong location in environment 120A. As another example, log 150 may indicate that software 140B has introduced bugs and/or errors to environment 120B.

Deployment tool 125 analyzes log 150 to determine errors 155 that occurred in the deployment of software 140. Deployment tool 125 can inspect the statuses indicated by log 150 to determine errors 155. In the illustrated example of FIG. 1, deployment tool 125 has determined that an error 155A occurred in the deployment of software 140A in environment 120A. Deployment tool 125 has also determined that error 155B occurred in the deployment of software 140B in environment 120B.

Deployment tool 125 uses solution matrix 145 to determine solutions 160 for repairing errors 155. After the solution 160 is determined, deployment tool 125 deploys the solution 160 to appropriate environment 120 to repair the error 155. In the illustrated example of FIG. 1, deployment tool 125 has determined a solution 160A for repairing error 155A. Deployment tool 125 deploys solution 160A to environment 120A. Deployment tool 125 has also determined solution 160B for repairing error 155B. Deployment tool 125 deploys solution 160B to environment 120B. Using the previous example, if error 155A indicates that software 140A is deployed to an incorrect location, solution 160A may be to move software 140A to the appropriate location within environment 120A. If error 155B indicates that software 140B has introduced an error or bug into environment 120B, solution 160B may to alter the software or source code of software 140B and to deploy that change to environment 120B.

Deployment tool 125 generates a report 165 and communicates report 165 to notify users 105 of any detected errors 155 and solution 160. In this manner, users 105 may be alerted of any errors 155 and solutions 160 that deployment tool 125 has detected and/or implemented.

In particular embodiments, deployment tool 125 automatically detects errors 155 in the deployment of software 140 in environment 120. Deployment tool 125 then automatically determines a solution 160 for repairing error 155. Deployment tool 125 then deploys the determined solution 160. In this manner, software 140 is ensured to be executable in environment 120. The operation of deployment tool 125 will be described in more detail using FIGS. 2 and 3.

FIG. 2 illustrates an example deployment tool 125 of the system 100 of FIG. 1. As shown in FIG. 2, deployment tool 125 uses a log 150 and a solution matrix 145 to automatically detect and repair errors in software deployment. In certain embodiments, deployment tool 125 ensures that software deployments can be executed properly by automatically repair errors in the software deployments.

Deployment tool 125 receives log 150. Log 150 can be generated by various environments where software was deployed. In the illustrated example of FIG. 2, log 150 indicates that three pieces of software 140A, 140B, and 140C have been deployed. Log 150 also indicates the status of the software deployments. In the illustrated example of FIG. 2, software 140A has status 205A, software 140B has status 205B, and software 140C has status 205C. Status 205 can indicate any errors and/or abnormalities about the deployment of software 140. For example, status 205A can indicate that software 140A has been deployed to a certain location or path, which may be incorrect. As another example, status 205B may indicate that software 140B introduced a software or bug into an environment. Status 205C can indicate that software 140C has introduced an error or bug into an environment.

Deployment tool 125 can analyze each of the statuses 205 to determine whether an error 155 has occurred. In the illustrated example of FIG. 2, deployment tool 125 determines that Error 1 155A has occurred during the deployment of software 140A. Deployment tool 125 determines that Error 2 155B has occurred during the deployment of software 140B. Deployment tool 125 determines that Error 3 155C has occurred during the deployment of software 140C. Deployment tool 125 can determine any type of error 155. For example, deployment tool 125 may determine that Error 1 155A indicates that software 140A is deployed to an incorrect location. Deployment tool 125 can determine that Error 2 155B and Error 3 155C indicate that software 140B and software 140C have introduced an error or bug into an application or environment.

Deployment tool 125 uses solution matrix 145 to determine the appropriate course of action for a detected error 155. Solution matrix 145 indicates an error and possible solutions to that error. In the illustrated example of FIG. 2, solution matrix 145 indicates possible solutions for Error 1 and Error 2. Solution matrix 145 indicates a Solution 1 and a Solution 2 for Error 1 and Error 2. Solution matrix 145 also includes solution vectors for each error indicating a likelihood of success of each solution for repairing the error. In the illustrated example of FIG. 2, the solution vector for Error 1 indicates that Solution 1 has a value of 0.3 and Solution 2 has a value of 0.2. This may indicate that Solution 1 is more likely to repair Error 1 than Solution 2. In contrast, the solution vector for Error 2 indicates that Solution 1 has a value of 0.2 and Solution 2 has a value of 0.5. This may indicate that Solution 2 has a higher likelihood of repairing Error 2 than Solution 1. This disclosure contemplates solution matrix including any number of solution vectors and the solution vectors including any values. For example, the solution vectors may be binary solution vectors that indicate whether the solution will repair or not repair the indicated error.

Deployment tool 125 uses the solution vectors to determine possible solutions 160 for errors 155. In the illustrated example of FIG. 2, deployment tool 125 determines Solution 1 160A to repair Error 1 150A and Solution 2 160B for repairing Error 2 155B. These solutions 160 may be determined based on the solution vectors for Error 1 and Error 2. For example, because the solution vector for Error 1 indicates that Solution 1 has a higher likelihood of repairing Error 1, deployment tool 125 may select Solution 1 160A to repair Error 1 155A. In contrast, because the solution vector for Error 2 indicates that Solution 2 has a higher likelihood of repairing Error 2, deployment tool 125 may select Solution 2 160B to repair Error 2 155B. After the solutions 160 are determined, deployment tool 125 deploys the determined solutions 160 to repair the errors 155.

In some embodiments, deployment tool 125 generates and communicates an alert 210 if an error 155 does not have a corresponding entry or solution vector in solution matrix 145. In the illustrated example of FIG. 2, Error 3 155C does not have a corresponding entry or solution vector in solution matrix 145. Deployment tool 125 may analyze solution matrix 145 to determine that Error 3 155C does not have a corresponding entry of solution vector. In response, deployment tool 125 generates and communicates alert 210. Alert 210 indicates that a solution should be proposed for Error 3 155C. Deployment tool 125 communicates alert 210 to a user in system 100. The user may then respond to alert 210 by proposing a solution to repair Error 3 155C.

In certain instances, a deployed solution does not repair an error. In the illustrated example of FIG. 2, deployment tool 125 receives an indication that Error 1 155A was not repaired by Solution 1 160A. In response, deployment tool 125 analyzes solution matrix 145 to determine another solution to repair the error. As an example, deployment tool 125 may select the solution with the next highest likelihood of repairing the error based on the solution vector for that error. In the illustrated example of FIG. 2, deployment tool 125 selects Solution 2 160B to repair Error 1 155A because Solution 2 has the next highest likelihood of repairing Error 1 after Solution 1. Deployment tool 125 then deploys Solution 2 160B to repair Error 1 155A.

Deployment tool 125 generates and communicates report 165 to indicate the detected errors and the statuses of any repairs for those errors. For example, report 165 may indicate that Error 1 155A, Error 2 155B and Error 3 155C were detected. Report 165 may also indicate that Solution 1 160A and Solution 2 160B were deployed to repair Error 1 155A and Error 2 155B. Report 165 may also indicate that alert 210 was communicated for Error 3 155C because no corresponding entry or solution vector for Error 3 155C exists in solution matrix 145. In some instances, report 165 may also indicate that Solution 2 160B was deployed to repair Error 1 155A.

In particular embodiments, deployment tool 125 can determine a priority for detected errors 155. For example, solution matrix 145 may indicate whether a particular error 155 is critical or non-critical. Deployment tool 125 can then determine based on solution matrix 145 whether a detected error 155 is critical or non-critical. In response, deployment tool 125 can first deploy solutions for critical errors and then deploy solutions for non-critical errors. Using the example of FIG. 2, deployment tool 125 may determine that Error 1 155A is critical and Error 2 155B is not critical. As a result, deployment tool 125 can deploy Solution 1 160A to correct Error 1 155A before deploying Solution 2 160B to correct Error 2 155B. In this manner, deployment tool 125 can correct errors 155 that are more critical to the functioning of environments 120.

FIG. 3 illustrates a flowchart illustrating a method 300 for deploying software using the system 100 of FIG. 1. In certain embodiments, deployment tool 125 performs method 300. By performing method 300, deployment tool 125 ensures that software deployed to an environment executes properly.

Deployment tool 125 begins by detecting that a first piece of software has been deployed in a first environment in step 305. In step 310, deployment tool 125 detects that a second piece of software has been deployed in a second environment. The first piece of software and the second piece of software may be one or more of a fresh installation of software, a software patch or a software update.

Deployment tool 125 determines that a first error occurred when the first piece of software was deployed in step 315. In step 320, deployment tool 125 determines that a second error occurred when the second piece of software was deployed. This disclosure contemplates any type of error occurring during the deployment of software. For example, the error may be that the software was deployed to an incorrect location. As another example, the error may be that the software introduced an error or bug into the environment.

Deployment tool 125 determines based on a stored solution matrix that a first solution should be implemented to correct the first error in step 325. In step 330, deployment tool 125 determines based on the solution matrix that a second solution should be implemented to correct the second error. This disclosure contemplates any solution being determined to correct an error. For example, the solution may be to move the software to a correct location. As another example, the solution may be to change and/or alter source code to correct any errors or bugs that were introduced.

Deployment tool 125 implements the first solution in the first environment in step 335. In step 340, deployment tool 125 implements the second solution in the second environment. In this manner, deployment tool 125 implements solutions to correct errors in one or more environments.

Modifications, additions, or omissions may be made to method 300 depicted in FIG. 3. Method 300 may include more, fewer, or other steps. For example, steps may be performed in parallel or in any suitable order. While discussed as deployment tool 125 (or components thereof) performing the steps, any suitable component of system 100, such as device(s) 110 for example, may perform one or more steps of the method.

Although the present disclosure includes several embodiments, a myriad of changes, variations, alterations, transformations, and modifications may be suggested to one skilled in the art, and it is intended that the present disclosure encompass such changes, variations, alterations, transformations, and modifications as fall within the scope of the appended claims.

What is claimed is:

1. A deployment tool comprising:
   a memory configured to store a solution matrix, the solution matrix comprises a first solution vector and a second solution vector, the first solution vector indicating a first likelihood that a first solution will correct a first error and a second likelihood that a second solution will correct the first error, the second solution vector indicating a third likelihood that the first solution will correct a second error and a fourth likelihood that the second solution will correct the second error; and
   a hardware processor communicatively coupled to the memory, the hardware processor configured to:
      detect that a first piece of software has been deployed in a first environment;
      detect that a second piece of software has been deployed in a second environment separate from the first environment;
      determine that the first error occurred when the first piece of software was being deployed to the first environment;
      determine that the second error occurred when the second piece of software was being deployed to the second environment;
      determine that the first solution should be implemented to correct the first error in the first environment in response to determining that the first likelihood is higher than the second likelihood;
      determine that the second solution should be implemented to correct the second error in the second environment in response to determining that the fourth likelihood is higher than the third likelihood;
      in response to the determination that the first solution should be implemented, implement the first solution in the first environment; and
      in response to the determination that the second solution should be implemented, implement the second solution in the second environment.

2. The deployment tool of claim 1, wherein the hardware processor is further configured to generate a report indicating that the first and second errors occurred and that the first and second solutions were implemented.

3. The deployment tool of claim 1, wherein the hardware processor is further configured to:
   determine that the first solution did not correct the first error; and
   in response to the determination that the first solution did not correct the first error, implement the second solution in the first environment.

4. The deployment tool of claim 1, wherein the hardware processor is further configured to:
   determine that the first error is critical and that the second error is non-critical; and
   in response to the determination that the first error is critical and that the second error is non-critical, implement the first solution in the first environment before implementing the second solution in the second environment.

5. The deployment tool of claim 1, wherein the hardware processor is further configured to:
   detect that a third error occurred when deploying the first piece of software;
   determine that the solution matrix does not indicate the third error; and
   communicate an alert indicating that the third error occurred and that the solution matrix does not indicate the third error.

6. A method comprising:
   storing, by a memory, a solution matrix, the solution matrix comprises a first solution vector and a second solution vector, the first solution vector indicating a first likelihood that a first solution will correct a first error and a second likelihood that a second solution will correct the first error, the second solution vector indicating a third likelihood that the first solution will correct a second error and a fourth likelihood that the second solution will correct the second error; and
   detecting, by a hardware processor communicatively coupled to the memory, that a first piece of software has been deployed in a first environment;
   detecting, by the hardware processor, that a second piece of software has been deployed in a second environment separate from the first environment;
   determining, by the hardware processor, that the first error occurred when the first piece of software was being deployed to the first environment;
   determining, by the hardware processor, that the second error occurred when the second piece of software was being deployed to the second environment;
   determining, by the hardware processor that the first solution should be implemented to correct the first error in the first environment in response to determining that the first likelihood is higher than the second likelihood;
   determining, by the hardware processor that the second solution should be implemented to correct the second error in the second environment in response to determining that the fourth likelihood is higher than the third likelihood;
   in response to the determination that the first solution should be implemented, implementing, by the hardware processor, the first solution in the first environment; and
   in response to the determination that the second solution should be implemented, implementing, by the hardware processor, the second solution in the second environment.

7. The method of claim 6, further comprising generating, by the hardware processor, a report indicating that the first and second errors occurred and that the first and second solutions were implemented.

8. The method of claim 6, further comprising:
   determining, by the hardware processor, that the first solution did not correct the first error; and
   in response to the determination that the first solution did not correct the first error, implementing, by the hardware processor, the second solution in the first environment.

9. The method of claim 6, further comprising:
   determining, by the hardware processor, that the first error is critical and that the second error is non-critical; and in response to the determination that the first error is critical and that the second error is non-critical, implementing, by the hardware processor, the first solution in the first environment before implementing the second solution in the second environment.

10. The method of claim 6, further comprising:
detecting, by the hardware processor, that a third error occurred when deploying the first piece of software;
determining, by the hardware processor, that the solution matrix does not indicate the third error; and
communicating, by the hardware processor, an alert indicating that the third error occurred and that the solution matrix does not indicate the third error.

11. A system comprising:
a first environment;
a second environment separate from the first environment; and
a deployment tool configured to:
  store a solution matrix, the solution matrix comprises a first solution vector and a second solution vector, the first solution vector indicating a first likelihood that a first solution will correct a first error and a second likelihood that a second solution will correct the first error, the second solution vector indicating a third likelihood that the first solution will correct a second error and a fourth likelihood that the second solution will correct the second error;
  detect that a first piece of software has been deployed in the first environment;
  detect that a second piece of software has been deployed in the second environment;
  determine that the first error occurred when the first piece of software was being deployed to the first environment;
  determine that the second error occurred when the second piece of software was being deployed to the second environment;
  determine that the first solution should be implemented to correct the first error in the first environment in response to determining that the first likelihood is higher than the second likelihood;
  determine that the second solution should be implemented to correct the second error in the second environment in response to determining that the fourth likelihood is higher than the third likelihood;
  in response to the determination that the first solution should be implemented, implement the first solution in the first environment; and
  in response to the determination that the second solution should be implemented, implement the second solution in the second environment.

12. The system of claim 11, wherein the deployment tool is further configured to generate a report indicating that the first and second errors occurred and that the first and second solutions were implemented.

13. The system of claim 11, wherein the deployment tool is further configured to:
  determines that the first solution did not correct the first error; and
  in response to the determination that the first solution did not correct the first error, implement the second solution in the first environment.

14. The system of claim 11, wherein the deployment tool is further configured to:
  determine that the first error is critical and that the second error is non-critical; and
  in response to the determination that the first error is critical and that the second error is non-critical, implement the first solution in the first environment before implementing the second solution in the second environment.

15. The system of claim 11, wherein the deployment tool is further configured to:
  detect that a third error occurred when deploying the first piece of software;
  determine that the solution matrix does not indicate the third error; and
  communicate an alert indicating that the third error occurred and that the solution matrix does not indicate the third error.

* * * * *